US012750833B2

(12) United States Patent
Fu et al.

(10) Patent No.: US 12,750,833 B2
(45) Date of Patent: Sep. 29, 2026

(54) APPLICATION OF ACCESS POINT IN 6GHZ FREQUENCY BAND

(71) Applicant: HEWLETT PACKARD ENTERPRISE DEVELOPMENT LP, Spring, TX (US)

(72) Inventors: Xiaoyang Fu, Beijing (CN); Junpeng Wu, Beijing (CN); Xuguang Jia, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 252 days.

(21) Appl. No.: 18/788,891

(22) Filed: Jul. 30, 2024

(65) Prior Publication Data

US 2026/0040287 A1 Feb. 5, 2026

(51) Int. Cl.
*H04W 72/0453* (2023.01)
*H04W 88/08* (2009.01)

(52) U.S. Cl.
CPC ........ *H04W 72/0453* (2013.01); *H04W 88/08* (2013.01)

(58) Field of Classification Search
CPC .......................... H04W 72/0453; H04W 88/08
See application file for complete search history.

(56) References Cited

U.S. PATENT DOCUMENTS

| | | | | | |
|---|---|---|---|---|---|
| 12,520,161 | B2 * | 1/2026 | Desai | .................... | H04W 16/02 |
| 2023/0403690 | A1 * | 12/2023 | Palayur | ............. | H04W 72/0453 |
| 2023/0413189 | A1 * | 12/2023 | Wang | ................ | H04W 72/0453 |
| 2024/0098615 | A1 * | 3/2024 | Anantharaman | ..... | H04W 40/10 |
| 2025/0159650 | A1 * | 5/2025 | Mittal | .................. | G01S 19/396 |
| 2025/0331038 | A1 * | 10/2025 | Ficara | .................. | H04W 76/14 |

OTHER PUBLICATIONS

"Part 15 Subpart E U-NII 6 GHz General Guidance Bands 5, 6, 7, 8", Federal Communications Commission Office of Engineering and Technology Laboratory Division Publication, May 20, 2022, 20 pages.

* cited by examiner

*Primary Examiner* — Joseph E Avellino
(74) *Attorney, Agent, or Firm* — Hewlett Packard Enterprise Patent Department

(57) ABSTRACT

In implementations of the present disclosure, there is provided an approach for an application of access point in the 6 GHz frequency band. A method comprises configuring a mode of the AP as a 6 GHz station mode in a case that the AP is enabled on a 6 GHz frequency band. Then, a list of target APs around the AP working on the 6 GHz frequency band is obtained. Next, the AP selects a target AP from the list of target APs and connects to the selected target AP by setting a power of the AP to be lower than a power of the target AP by a predetermined value. After the AP connects to the target AP, the AP sends a request including global positioning system (GPS) information to an automated frequency coordination (AFC) server via the target AP to obtain a response including allowed power information.

20 Claims, 8 Drawing Sheets

APPLICATION OF ACCESS POINT IN 6GHZ FREQUENCY BAND

BACKGROUND

The standard power (SP) access points (APs) have been approved for use within the unlicensed 6 GHz frequency band, which spans from 5925 to 7125 MHz (UNII-5 and UNII-7). This frequency range is currently utilized for various services such as wireless backhaul, utilities, and public safety. The Automated Frequency Coordination (AFC) system and AFC Device specifications have been introduced by industry standards bodies to support operations of the APs in the 6 GHz outdoor frequency band. They ensure that the operations of the APs coexist with existing services.

APs play a crucial role in wireless networks, enabling devices to connect and communicate seamlessly. Deploying the APs in the 6 GHz frequency band offers significant advantages for wireless communication. This frequency band provides wide bandwidth and low latency, making it ideal for high-density wireless deployments in urban centers, large convention centers, and densely populated residential areas.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
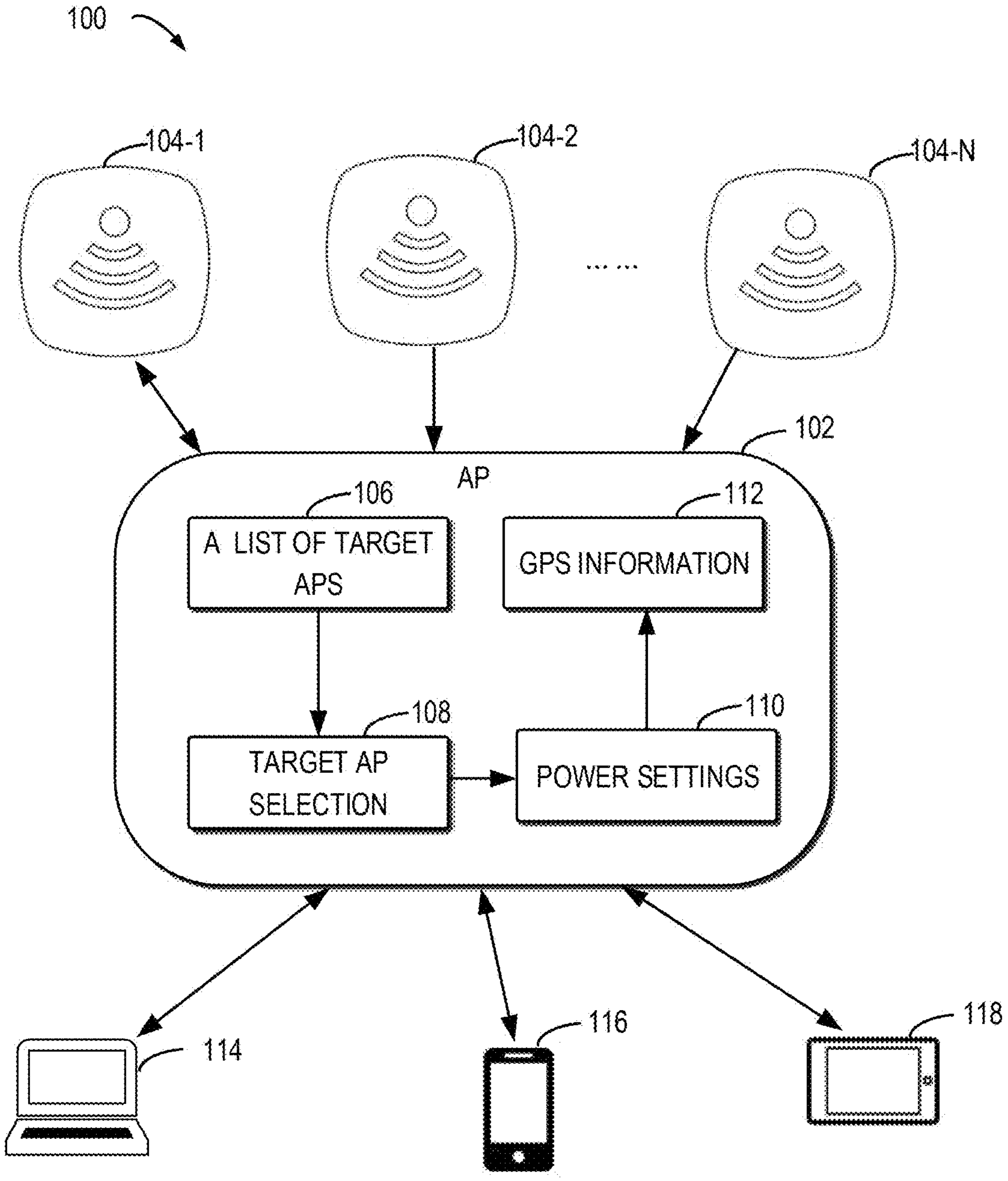
FIG. 1 illustrates a block diagram of an example environment in which reference implementations of the present disclosure may be implemented.

As discussed above, the SP APs have been approved to be used in the 6 GHz frequency band. However, when the AP works on the 6 GHz in a AP mode, the AP requires an authorization from an AFC server. During this process, when the AP is enabled, the 6 GHz radio function of the AP needs to be disabled first, and a GPS module is used to collect location information. However, this collection procedure could take about 5-20 minutes. Then, the AP sends an AFC spectrum request to an AFC service through a backhaul link, waits for an AFC response with a permitted SP power table including an allowed 6 GHz SP channel list and related maximum power values, and then decides whether to bring the 6 GHz radio up or not. Therefore, the above procedure takes a long time.

Moreover, there are many other problems. For example, the AP has to use the 5 GHz frequency band or the 2.4 Ghz frequency band to establish a link with a target AP which can transfer the AFC request to the AFC server, for example, a mesh portal or an upper AP, and wait for the AFC response to bring 6 Ghz radio up. However, if the customer provisions the AP only on the 6 GHz frequency band, the AP will never be established. Moreover, if only dynamic frequency selection (DFS) channels are allowed and the AP encounters consecutive radar signal detections on 5 GHz, the AP cannot utilize the 6 GHz frequency band before receiving the AFC response.

Therefore, implementations of the present disclosure propose a solution for applying an access point in 6 GHz frequency band. According to implementations of the present disclosure, the AP may configure its mode as a 6 GHz station mode when the AP is enabled on a 6 GHz frequency band. Next, the AP may obtain a list of APs working on the 6 GHz frequency band by performing passive scanning. Then, a target AP from the list of APs is selected and the AP is connected to the target AP. When the AP connects to the target AP, the AP sets its maximum power to be lower than a power of the target AP by a predetermined value. After the AP has been connected to the target AP, the AP sends a request including global positioning system (GPS) information to an AFC server via the target AP to obtain a response including allowed power information.

Therefore, when the AP is enabled, the AP is used as a station, which causes the AP to communicate with the target AP directly on the 6 GHz frequency band, for example, communicating with a mesh portal or an upper AP. Then, the AP sends the AFC request to the AFC server via the link on a 6 GHz link to obtain the response from the AFC server. Thus, the AP can activate the 6 GHz band radio instantaneously without delay, while remaining fully compliant with and not violating the current AFC protocol.

Other advantages of implementations of the present disclosure will be described with reference to the reference implementations as described below. Reference is made below to FIG. 1 through FIG. 8 to illustrate basic principles and several reference implementations of the present disclosure herein.

FIG. 1 shows a block diagram of an example environment in which reference implementations of the present disclosure may be implemented. In the example environment 100 of FIG. 1, an AP 102 may allow wireless devices to connect to a wired network using Wi-Fi. Its primary function is to act as a central transmitter and receiver of wireless radio signals. The AP 102 may be used in the 6 GHz frequency band. The AP 102 has two device roles, one is a standard client which creates the uplink connection and follows a connected mesh portal or upper AP channel/power, and the other is a standard power AP.

When the AP 102 is enabled to use in the 6 GHz frequency band, in order to avoid wasting more time to wait for establishing a link in the 6 GHz frequency band, the AP 102 is configured to be in a 6 GHz station mode and only one 6 GHz station mode virtual AP (VAP) works. The AP mode VAP is prohibited from being used in this stage. Therefore, the AP 102 plays a role of a station within the 6 GHz frequency band. This mode enables the AP 102 to utilize the spectrum efficiency and reduced interference characteristics offered by the 6 GHz frequency range. Upon being activated in this mode, the AP performs a passive scanning to obtain beacons sent by a set of neighbor APs, which is also referred to as a set of target APs, for example, AP 104-1, AP 104-2, . . . , AP 104-N, wherein the N is an integer. The target AP may communicate with the AFC server and can transfer the AFC requests from the stations to the AFC server.

The AP 102 may obtain the information of the set of target APs through the received beacons. The beacons received by the AP 102 may include essential details for connecting to the network. For example, one beacon may include a basic service set identifier (BSSID), a service set identifier (SSID), a channel number and a frequency, and a received signal strength indicator (RSSI). The above information includes an identifier of the target AP.

Therefore, the AP 102 may obtain information from a set of target APs by performing passive scanning. This scanning process allows the AP to construct a list of target APs 106 available for connection. Once the list of the target APs is established, the AP proceeds to a target AP selection 108 to select a target AP from the list of the target APs based on various criteria, such as signal strength, network congestion, and operational requirements. Upon identifying the target AP, for example, the target AP 104-1, the AP 102 may obtain the power of the target AP 104-1, then perform power settings 110 to configure its power to be slightly lower than that of the target AP. For example, the power of the AP 102 is lower than the target AP 104-1 by 6 dB. In this case, the AP 102 may be used as a station of the target AP 104-1. This power adjustment helps in mitigating potential interference issues and ensures compliance with restrictions governing the 6 GHz spectrum usage.

After the AP 102 has established a connection to the target AP 104-1, the AP 102 then engages in further network configuration tasks. In this state, the AP 102 needs to collect Global Positioning System (GPS) information, which includes longitude, latitude, altitude, and height above ground/elevation. Then, the AP 102 sends an AFC request to an AFC server through the connected target AP 104-1. This AFC request includes precise GPS coordinates of the AP's location, essential for the AFC server to accurately assess the regulatory environment and spectrum availability in that area.

The AFC server processes the received GPS information 112 and promptly responds with crucial details, including a power table that the AP can utilize for its wireless transmissions. The power table contains a channel list that the AP 102 may use and the corresponding power for each channel in the channel list. This response is crucial as it ensures that the AP operates within legally defined parameters. Consequently, the AP may adjust its transmission power settings based on the AFC response, thereby maintaining reliable operations within the 6 GHz frequency band.

When the AP 102 is allowed to use the channel in the channel list to communicate with the target AP 104-1, the AP 102 may be used as the AP mode and may provide service for the terminals connecting to the AP 102. For example, a laptop 114, a mobile phone 116 and a tablet 118 are connected to the AP 102 and they are the stations of the AP 102. The AP 102 may provide an AP mode VAP and provide service for the terminals.

In some implementations, the AP 102 and the target AP 104-1 are in the mesh network. Therefore, the AP 102 is used as a mesh point, and the target AP 104-1 is used as a mesh portal. In some implementations, the AP 102 and the target AP 104-1 are used in a network that includes different types of APs. In this case, the AP 102 may be used as a Wi-Fi uplink client, and the target AP 104-1 is used as an upper AP.

Therefore, the AP is configured in 6 GHz station mode and may establish connections to target APs. This process may maximize network efficiency and ensure seamless integration of the AP into the wireless network infrastructure, leveraging the advantages of the 6 GHz spectrum for enhanced connectivity and minimized interference.

Figure 2:
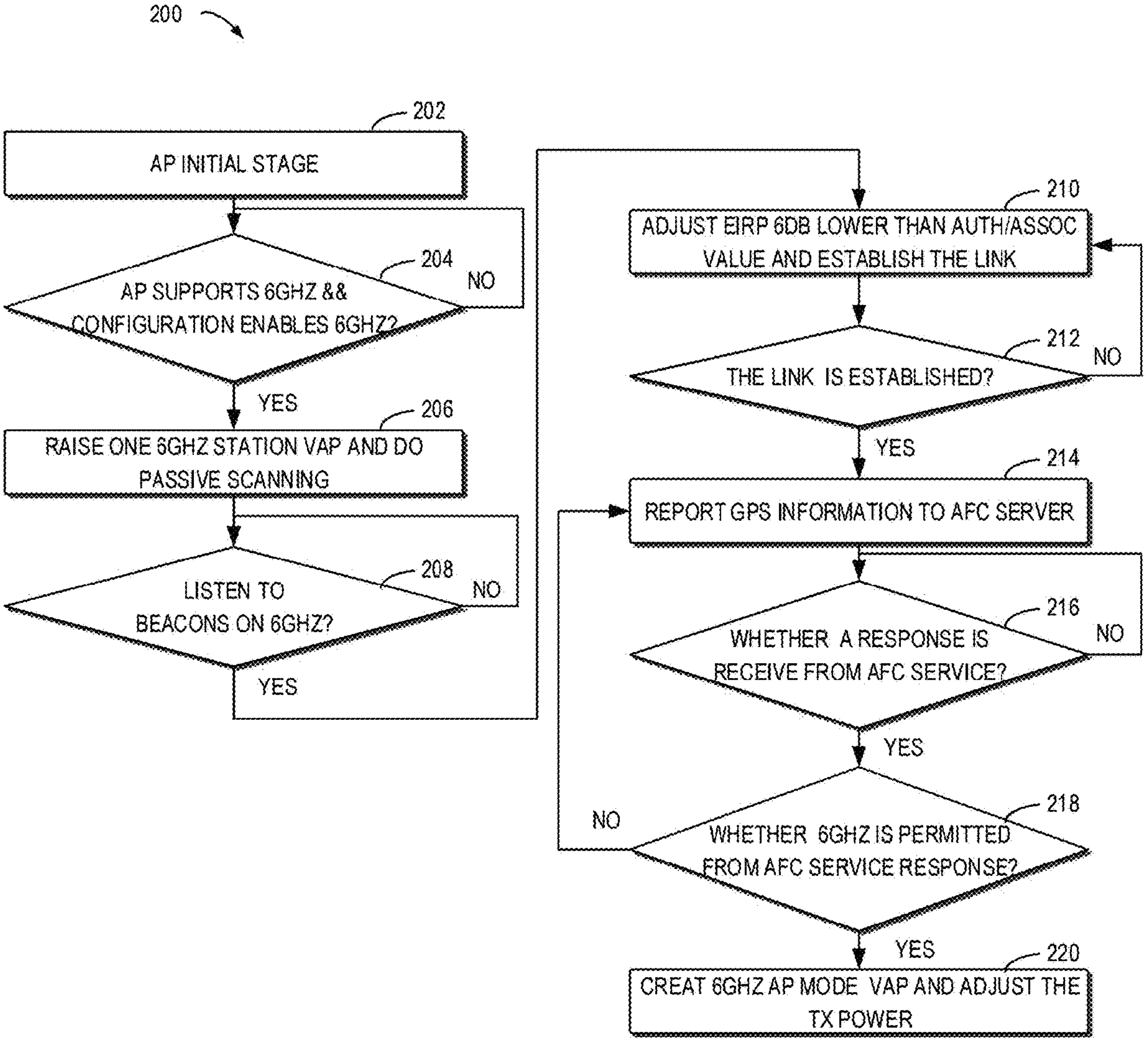
FIG. 2 illustrates an example of creating an AP in the 6 GHz frequency band according to implementations of the present disclosure.

FIG. 2 shows an example 200 of creating an AP in the 6 GHz frequency band according to implementations of the present disclosure. In the example 200, at block 202, the AP initial stage is started. At block 204, it is required to determine whether the AP supports 6 GHz and the configuration enables 6 GHz. If the AP does not support the 6 GHz or the configuration does not enable 6 GHz, it is needed to check again or perform other operations, for example, not permitting the AP to work on the 6 GHz. If the AP supports 6 GHz and the configuration enables the 6 GHz, at block 206, the AP 102 raises one 6 GHz station VAP and does passive scanning. The AP will only have one 6 GHz station mode VAP running up when brought up firstly on the 6 GHz frequency band, with no other AP mode VAP on 6 GHz. The AP will act as a pure station and do passive scanning. Next, at block 208, the AP determines whether to listen to beacons on 6 GHz. If the AP does not listen to the beacons, it will continue to listen to the beacon sent by the target APs. If the AP listens to beacons on 6 GHz. It will obtain information of the target AP around the AP, and then collect the target AP list from the beacons and maintain the SP AP list. Therefore, the AP may select a target AP from the list of target APs and connect to the target AP. For example, the selection may be based on signal strength, link quality, and so on.

According to the specification, the station must have a max power metric (power spectral density (PSD), effective isotropic radiated power (EIRP)) that is 6 dB lower than its connected SP AP via parsing the power element information element (IE) in the SP AP's Beacon. The target AP 104-1 may have the power table provided by the AFC service. AFC-provided SP power table that constrains for each allowed channel can use the below information to describe:

$$PowerTable_{AFC\ SP\ AP} = \{(Chan_i, \mathrm{Power}_{i,AP,max}) | i \in ChanList\}$$

$\mathrm{Power}_{i,\ AP,max}$ is the maximum allowed power for an SP AP on channel i, Chan; is the i-th channel. A power and channel list are determined by the corresponding power metrics from the AFC response and a regular domain requirement, and then the power constraint value $\mathrm{Power}_{i,STA,max}$ for its connected station (mesh point station mode) is determined on the same channel:

$$\mathrm{Power}_{i,STA,max} = \mathrm{Power}_{i,AP,max} - 6\ \mathrm{dB}$$

Therefore, at block 210, the AP may adjust EIRP of the 6 dB lower than the authorized or associated value and establish the link. At block 212, the AP detects whether a link between the AP and the target AP is established. If the link is not established successfully, the AP will continue to adjust the EIRP or select a new channel to establish the link. If the link is established successfully, the AP collects the GPS information of the AP. Then, at block 214, the AP reports GPS information to the AFC service by sending a AFC request to the AFC server via the target AP.

Next, at block 216, the AP continues to detect whether a response is received from the AFC server or an AFC service. If the AP does not receive the response, it will continue monitoring the response. If the AP receives the response, at block 218, the AP will determine whether the 6 GHz is permitted from the AFC service response. The AFC response has the available channel list and permitted powers for the requested operation. During this process, the AP may obtain the permitted channel list and max power to the target AP from the AFC service response, and the AP also needs to re-check the power table with the power table of the target AP to determine whether the AP may establish the AP mode VAP on the 6 GHz.

If the 6 GHz is not permitted, for example, the current channel number and power value are not proper, the AP continues to report the GPS information to the AFC server to obtain a new response from the AFC server. If the current SP channel number and power value are proper, the AP will create the AP mode 6 GHz VAPs and adjust the transmit power to use SP power in the AFC service requirement 220. After the AP mode VAP is established, the AP may provide services to the terminal connected to the AP.

During the process, the target AP acts as a proxy to reduce the AP waiting time. It can be seen that the target AP can act as a proxy to receive the GPS information of the Pure station mode AP after the link is established (all GPS info should be received from the AP instantly). The benefit of this method was that after a layer2 link is established, the AP can start reporting the GPS information to AFC service through the target AP, without waiting for the layer3 to be ready, since if layer3 meets some Internet Protocol (IP) or Domain Name System (DNS) issue, it will cause some delays when the AP connects to AFC service.

Moreover, for outdoor APs, the distance between the AP and the target AP may be maximum 15 km. Therefore, the AP and the target AP may receive different power tables in the AFC responses. Thus, even if the AP receives the AFC response and the AP can use the 6 GHz frequency band to connect with the target AP, the SP channel list for the AP in AFC responses may have no intersection or partial intersection with that of the target AP because the target AP and the AP may be in different locations.

For example, if there is no intersection, the 6 GHz mesh link cannot be established and it will lead to poor customer experience. For the partial intersection, if the target AP and the AP cannot synchronize the channel lists, it will lead to unexpected issues. Moreover, the PSD and EIRP values of the related SP channel may fail to cover the spectrum range even though the SP channel numbers matched between them. In order to solve the channel/power diversity in AFC responses between the AP and the target AP, enhanced strategies are made to handle this diversity case, as shown in FIG. 3 and FIG. 4.

Figure 3:
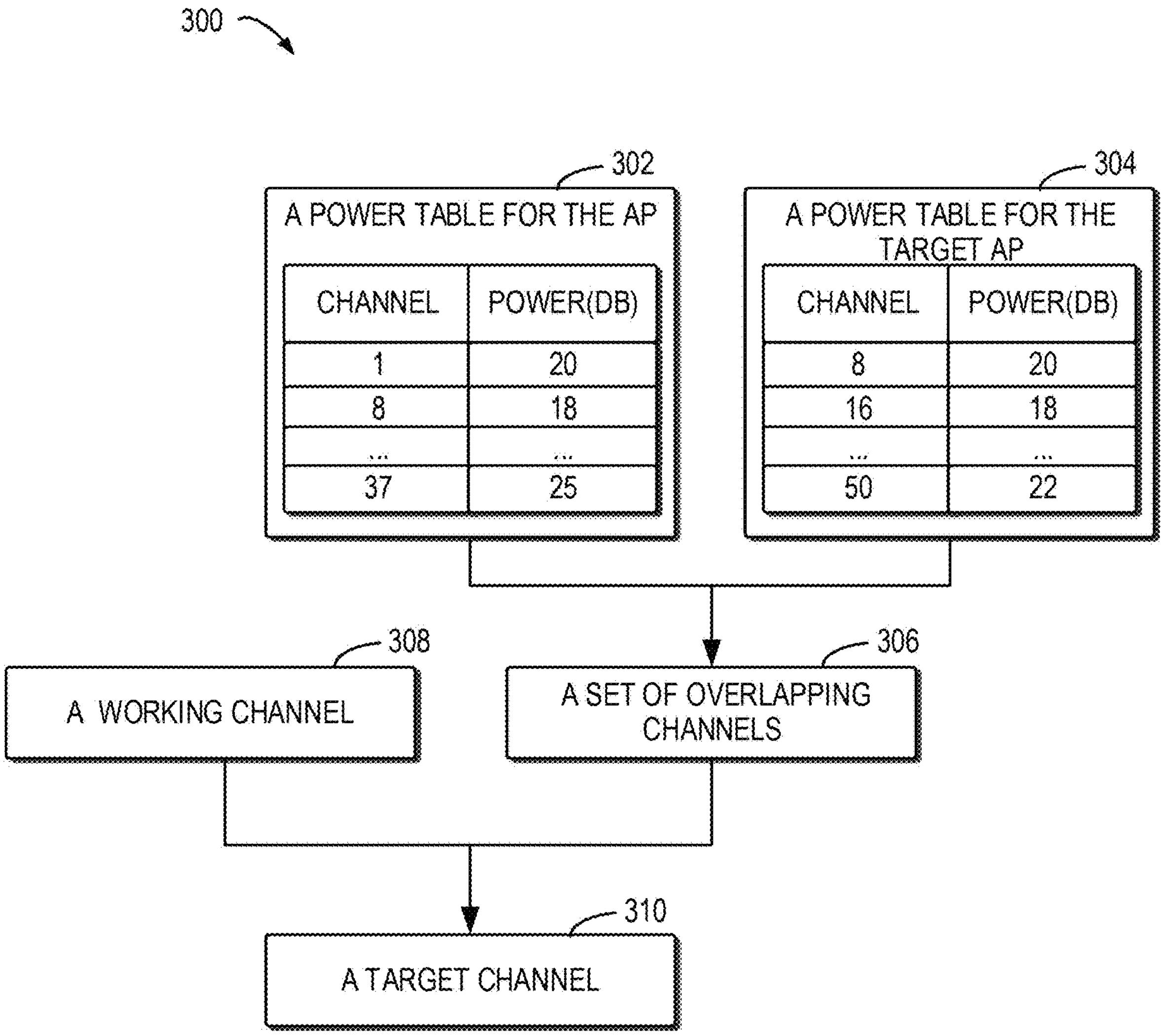
FIG. 3 illustrate an example of establishing a target channel according to implementations of the present disclosure.
Figure 4:
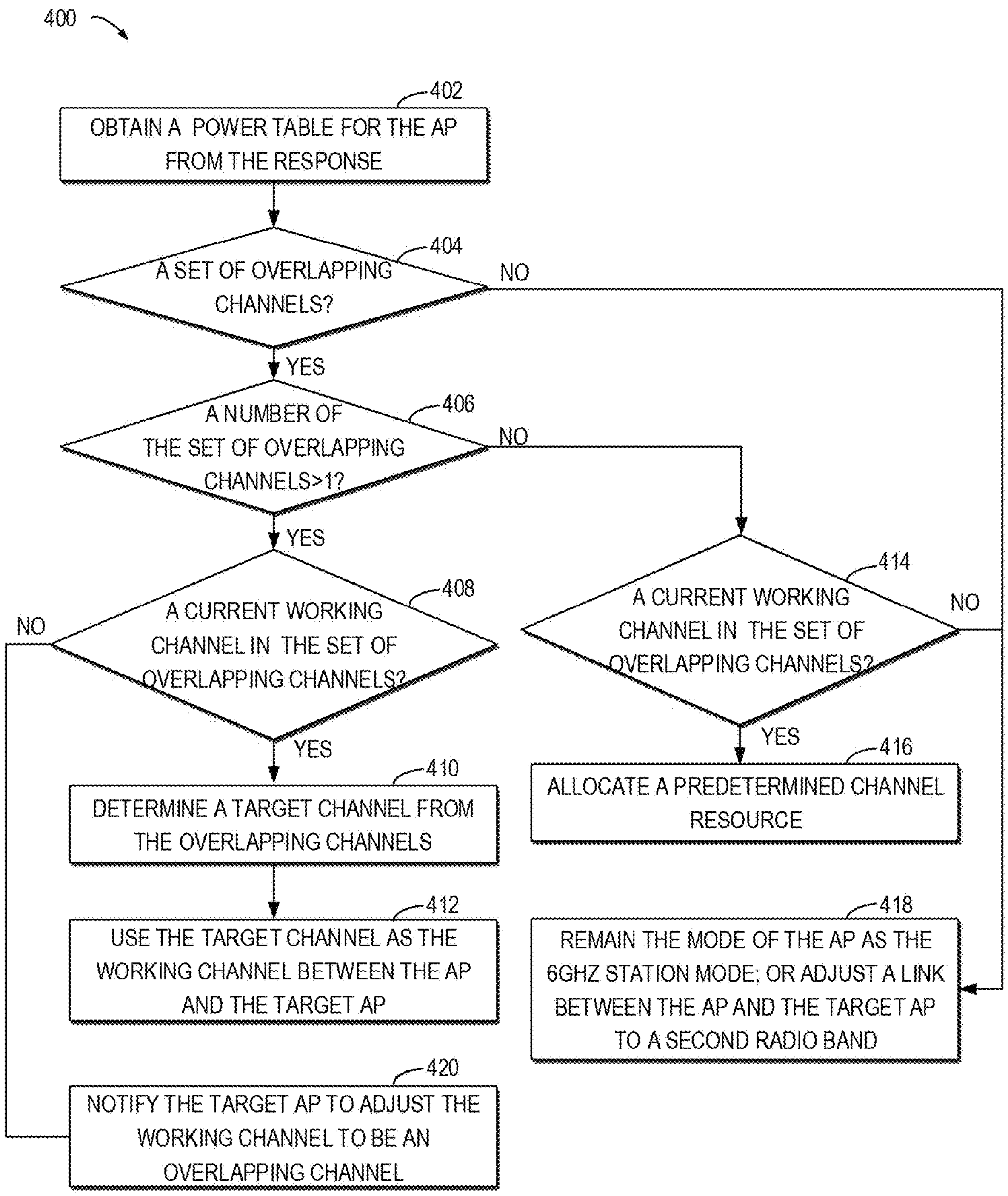
FIG. 4 illustrates an example of selecting a working channel according to implementations of the present disclosure.

FIG. 3 shows examples 300 of establishing a target channel according to implementations of the present disclosure. The AP may receive the AFC response by sending the AFC request to the AFC service. By analyzing the AFC response, the AP may obtain a power table 302 for the AP, which includes a channel list used by the AP and a corresponding power for each channel of the channel list. For example, the channel list included in the power table 302 for the AP may include channels 1, 8, . . . , and 37. The corresponding maximum powers corresponding to the above channels are 20, 18, . . . , 25.

Moreover, the AP may obtain the power table 304 for the target AP. For example, the AP may obtain the power table of the target AP based on the beacons from the target AP. The power table 304 for the target AP contains a channel list including channels 8, 16, . . . , and 50, and the corresponding maximum powers are 20, 18, . . . , and 22.

Next, the AP may compare the power table 302 for the AP and the power table 304 of the target AP, and determine whether there is a set of overlapping channels. If there is a set of overlapping channels, for example, channel 8, the AP needs to further check whether a working channel 308 between the AP and the target AP in the set of overlapping channels 306. If the working channel 308 is in the set of overlapping channels, a target channel 310 may be determined from the set of overlapping channels and be used to transmit traffics between the AP and the target AP. During this process, it is further necessary to check whether the power values can meet the requirements, for example being within a reasonable RF coverage range of the SP APs. At last, the channel of the SP AP with the maximum power value among all is selected. Additionally, the AP may also recommend the target AP to switch the channel.

If there are no overlapping channels between the AP and the target AP (for example, a Wi-Fi uplink client and an upper AP, or a mesh point and a mesh portal) or the working channel between the AP and the target AP is not in the set of overlapping channels, it needs to make below choices in strategy to choose a first processing way or a second process way, for example by a knob controlled by the user or by the internal policies.

In the first process way, the link between the AP and the target AP is remained and the 6 GHz SSID for the AP is disabled. In one example, the mesh link between the mesh portal and the mesh point remains and the 6 GHz SSID is disabled on the mesh point. In another example, the Wi-Fi uplink connection between the Wi-Fi uplink client and the upper AP remains and the 6 GHz SSID on Wi-Fi uplink device is disabled. Because the 6 GHz standard station can follow SP AP channel and power, it just needs to be −6 dB lower than target AP, so the AP can keep and not 6 GHz SSID. This way can keep the 6 GHz link and no flapping.

In the second processing way, the link between the AP and the target AP is moved to another frequency band like 5 GHz or 2.4 GHz, and the AP 6 GHz SSID is kept up. For example, the mesh link or the Wi-Fi uplink is moved to another band like 5 GHz or 2.4 GHz, and the mesh point or Wi-Fi uplink device 6 GHz SSID is kept up. Therefore, the 6 GHz SSID for the AP can still provide the access service for 6 GHz clients.

FIG. 4 illustrates an example 400 of selecting a working channel according to implementations of the present disclosure. In the example 400, at block 402, the AP 102 may obtain a power table for the AP from the response. For example, the AP 102 may act as a station of the target AP and send an AFC request to the AFC server to obtain the response from the AFC server. Then, the AP may obtain a power table from the response and compare the obtained power table with the power table of the target AP. The power table for the AP contains a channel list, which may be referred to as the first channel list. The power table of the target AP also includes a channel list, which may be referred to as a second channel list. Next, at block 404, the AP 102 checks whether there is a set of overlapping channels by comparing the power table for the AP and the power table for the target AP. The set of overlapping channels may be determined by:

$$Chan_{overlap} = \{Chan_{AFC\ SP\ STA}\} \cap \{Chan_{AFC\ SP\ AP}\}$$

wherein $Chan_{AFC\ SP\ STA}$ represents the channels for the AP supported by the AFC service, and $Chan_{AFC\ SP\ AP}$ represents the channels for the target AP supported by the AFC service. For example, the AP may be a mesh point or a Wi-Fi uplink client, and the target AP may be a mesh portal or an upper AP.

For example, the AP may compare the first channel list in the power table for the AP and the second channel list in the power table for the target AP. By comparing, the AP may determine whether this is a set of overlapping channels. If there are no overlapping channels, it shows that there is no channel that may be used by the AP and the target AP and the process goes to block 418. At block 418, the AP remains the mode of the AP as the 6 GHz station mode; or adjusts a link between the AP and the target AP to a second frequency band. The process in block 418 may refer to the above first processing way or the above second process way.

At block 406, the AP may determine whether the number of the set of overlapping channels is greater than 1. If the number of the set of overlapping channels is greater than 1, it means that the AFC-permitted channel lists of the AP and the target AP have an intersection with some channels available. In this case, $Chan_{overlap} \neq \emptyset$, and $ChanNum_{overlap} > 1$, the AP needs to check if a current working channel between the AP and the target AP is in this set of overlapping channels.

At block 408, the AP determines whether the current working channel is in the set of overlapping channels. If the current working channel is in the set of overlapping channels, at block 410, the AP will determine a target channel from the overlapping channels. In this case, the AP may evaluate if the power levels of the AP are compliant with the effective radio frequency (RF) coverage ranges of the power levels of the target AP for each channel in the set of overlapping channels. In other words, the AP will decide whether this channel is in the AP RF coverage. It means whether the AP can scan or listen to this channel. The compliant power is shown as:

$$\text{Power}_{compliant} = \{p \in Chan_{overlap}, \text{Power}_{STA}(p)\},$$

wherein $\text{Power}_{STA}$ (p) means from the AP (the mesh point) perspective, each target AP (the mesh portal) channel power level. A smart function f is defined with smart algorithm design, and optimal channel change $\text{Power}_{compliant}$ as one important criteria parameter is used as input values. The other parameters may be a direction, RSSI, Noise Figure (NF), Bandwidth (BW), etc. Then, the target channel is selected from the AP with the maximum power value for operation. For example, the formula f can be:

$$f_{finial\ selection} = \{\text{Power}_{compliant}|\text{Channel utility}|NF|BW|\}$$

Then, at block 412, the AP uses the target channel as the working channel between the AP and the target AP. After selecting the channel and the power, the AP may optimize uplink and downlink competition. For example, when the target channel is used as the working channel, if the AP still has primary "incumbent" users, which are already operating in the current 6 GHz channel bandwidth, then it needs to use less bandwidth or static puncture to avoid the spectrum they occupied. The AP or the target AP determines a puncture pattern based on an input from the AFC database and sets up a "punctured" basic service set (BSS), and all devices in the BSS shall abide by the "static" puncture pattern advertised in the beacon.

If the current working channel is not in the set of overlapping channels, at block 420, the AP may notify the target AP to adjust the working channel to be an overlapping channel. For example, the mesh point or the Wi-Fi uplink client needs to tell the mesh portal or the upper AP to select one channel in $Chan_{overlap}$ if possible. Then, the power selection is performed, for example, the operation described in block 410. If not possible for the Wi-Fi uplink case, the upper AP cannot be controlled, the Wi-Fi uplink client needs to perform with reference to the above first processing way and the second processing way.

If the number of the set of overlapping channels is not above 1 and equal to 1, for example, $Chan_{overlap} \neq \emptyset$ and $ChanNum_{overlap} = 1$, at block 414, the AP will check whether the current working channel is in the set of overlapping channels. If the current working channel is in the overlapping channels, at block 416, the AP may allocate a predetermined channel resource to the link between the AP and the target AP. In this case, it means only one channel is available for the mesh point to select. If the AP still have primary "incumbent" users, which are already operating in the current 6 GHz channel bandwidth, then it tries to use less bandwidth or static puncture to avoid the spectrum they occupied. The AP or the target AP may determine the puncture pattern based on input from the AFC database and set up a "punctured" BSS, and all devices in the BSS shall abide by the "static" puncture pattern advertised in the beacon.

If the current networking channel is not in the set of overlapping channels, this process goes to block 418. Moreover, if there are no overlapping channels between the AP and the target AP, the process goes to block 418.

Moreover, when the AP or the target AP, for example, mesh portal, mesh point, Wi-Fi uplink AP or upper SP AP, receives a new AFC response, and the current working channel is not in the new channel list, it may cause the link flapping (the channel switch will cause link flapping). Synchronization and notification strategy between the AP and the target AP is used to avoid 6 GHz link flapping and make the link switch smoothly.

Figure 5:
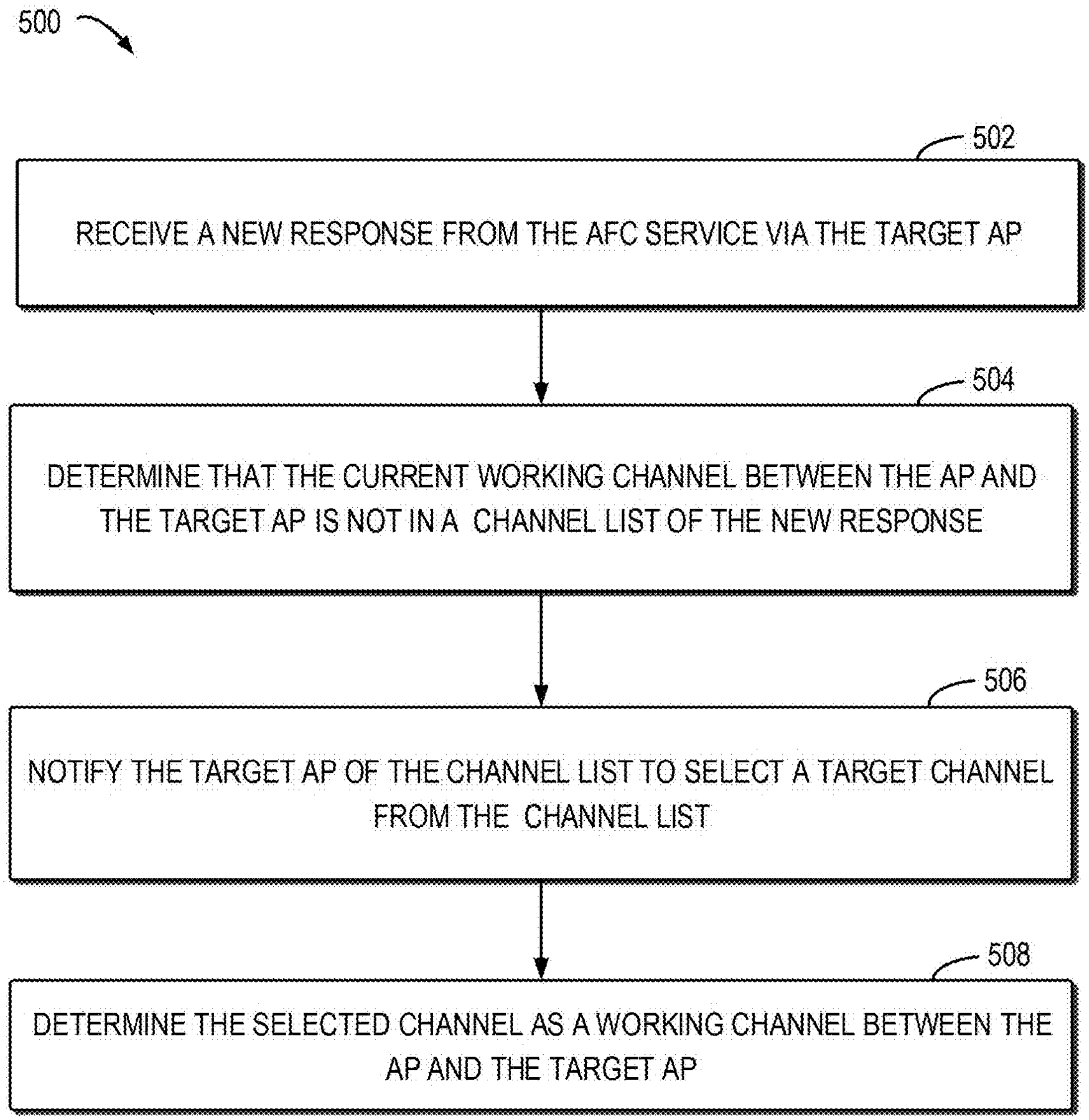
FIG. 5 illustrates an example of determining a working channel according to implementations of the present disclosure.

Generally, the AFC response expires in 24 hours, and the AFC service may push the AFC response to each AP in a shorter interval, such as 6 hours. When a new AFC response is received, an old AFC response is still valid before the expired time reaches, and the new AFC response may be held for a short period. In this short period, these devices may still exchange messages with the connected mesh portal, the mesh points, or the Wi-Fi uplink device as below. The AP or the target AP knows when the AFC response will expire, it can also do some operations if the current time is close to the expiration time and there is no new AFC response. FIG. 5 shows an example to process this situation.

FIG. 5 illustrates an example 500 of determining a working channel according to implementations of the present disclosure. In this example 500, at block 502, the AP or the target AP receives a new response from the AFC service via the target AP. For example, the mesh portal/point or the Wi-Fi uplink device receives a new response from the AFC server. The AP or the target AP may further determine whether the current working channel is still valid. If the current working channel is invalid, a new working channel needs to be established. If the current working channel is valid, the AP and the target AP may determine whether the working channel between the AP and the target AP is in a channel list of the new response. If it is determined that the current working channel between the AP and the target AP is in the channel list of the new response, the current channel is used continually and is not switched. At block, 504, it is determined that the current working channel between the AP and the target AP is not in the channel list of the new response. At block 506, the AP may notify the target AP of the channel list to select a target channel from the channel list. The target AP may calculate the intersection of the channel lists from all connected APs (mesh points) and itself, and tell the connected APs the next selected channel. Then, the target AP may send a channel switch announcement (CSA) frame to allow the target AP and all the APs to switch to the same channel. For the Wi-Fi uplink case, if the up-link AP is managed, the Wi-Fi uplink AP may communicate in the same process and switch the channel. At block 508, the AP determines the selected channel as a working channel between the AP and the target AP.

Moreover, if there is no intersection between the AFC channel lists of the AP and the target AP, the AP needs to notify the connected target AP that there is no intersection of the AFC channel lists, to fall back to the 5 GHz/2.4 GHz mesh link. The target AP may enable the mesh SSID on multiple bands, like enabling the target AP on both 5 GHz and 6 GHz frequency bands. When a 6 GHz mesh link cannot be established, the AP falls back to the 5 GHz mesh and connects to the target AP. In some implementations, if there is no intersection between the AFC channel lists of the mesh portal and mesh points, the mesh portal needs to notify the connected mesh points that there is no intersection of the AFC channel lists, to fall back to the 5 GHz/2.4 GHz link. Mesh portal can enable the mesh SSID on the multiple bands, like enabling mesh portal on both 5 GHz and 6 GHz. When a 6 GHz mesh link cannot be established, the mesh point falls back to the 5 GHz mesh and connects to the mesh portal. For the Wi-Fi uplink case, if there is no intersection of channel lists, the Wi-Fi uplink device may choose to be a wireless bridge only or switch another band to connect upper AP.

Figure 6:
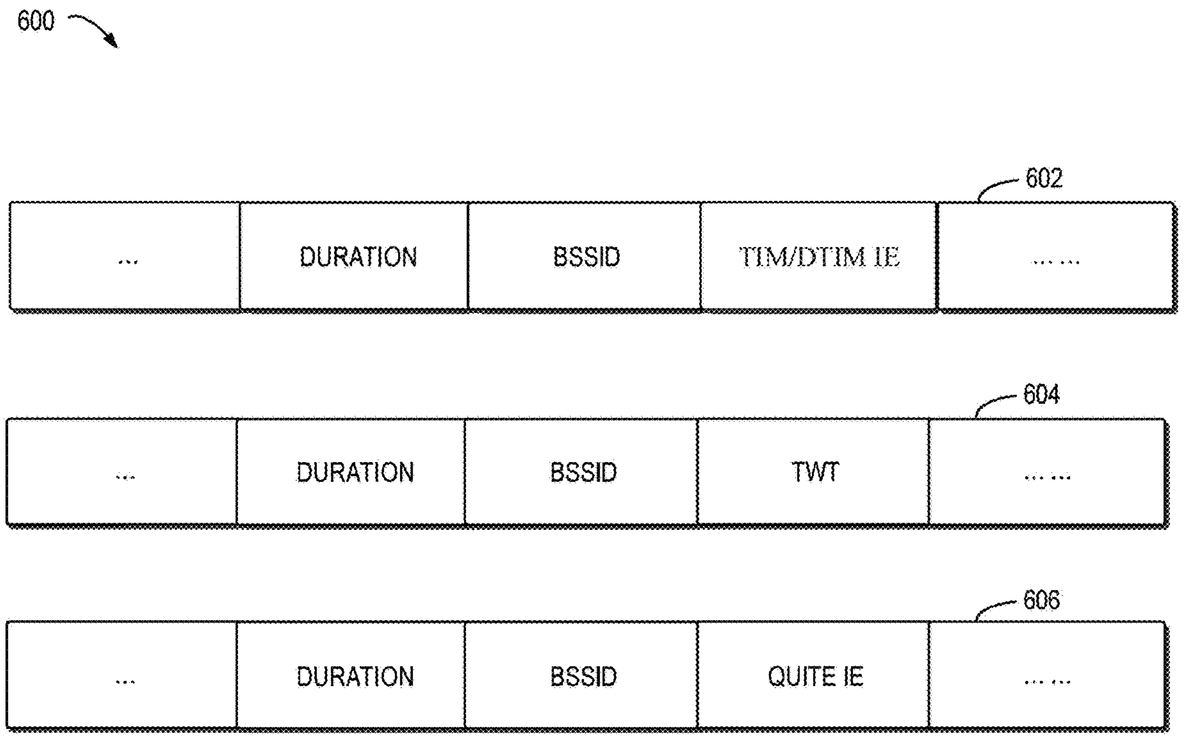
FIG. 6 illustrates some examples of beacon frames according to implementations of the present disclosure.

Furthermore, the 11ax/11be protocol may be optimized to avoid 6 GHz link flapping and make the link switch smoothly. The AFC service can tell the AP and the target AP the next AFC request time, and the AP and the target AP can know when the next AFC procedure happens. In order to avoid the traffic loss of the 6 GHz link, the AP and the target AP may do some operations. When a new AFC response is received and the old AFC response still has some time before the expiration time, for the multi-band or multi-link device (MLD) case, a traffic flow control or a TID-2-link mapping feature may be used to guide the traffic only send on the 5 Ghz or 2.4 GHz frequency band. For the single-band or non-MLD case, assuming only on a single 6 GHz mesh link case (pure client mode on 6 GHz radio), when the trigger time is met, the target AP or the AP may set the field of a beacon to guarantee traffic during the AFC procedure. FIG. 6 illustrates some examples 600 of beacon frames according to implementations of the present disclosure.

In the example 600, the beacon frame 602 includes the traffic indication map (TIM) and delivery traffic indication map (DTIM) information elements (IEs). The TIM/DTIM IE in beacon frames may be set by the target AP and sent to the AP to force the power save (PS) mode to buffer traffic for the clients during the channel switching. Another example of the beacon frame is a beacon frame 604, the target wake time (TWT) field is used to set to be a predetermined value. Therefore, the AP or the target AP may set up TWT (include all the broadcast/individual/restrict TWT) sessions to have the station in a power same mode. In the beacon frame 606, the quiet IE is set to notify the AP of a period of quiet time. The above method may prevent communication between the AP and the target AP.

If the AFC procedure fails to proceed and exceeds the time requirement, then the AP can only work in the pure station mode. Therefore, the 6 GHz link can still exist even with no channel intersection, because the pure 6 GHz SP station does not need to follow the AFC direction and can use the country code dynamic rate transmission (DRT) channel. In this case, the current 6 GHz link may be configured or dynamically changed as one affiliated AP of enhanced multi-Link single radio (EMLSR)/multi-Link single radio (MLSR) MLD, and other affiliated APs can be used as the BSS server AP/uplink station/scanning radios, etc.

Figure 7:
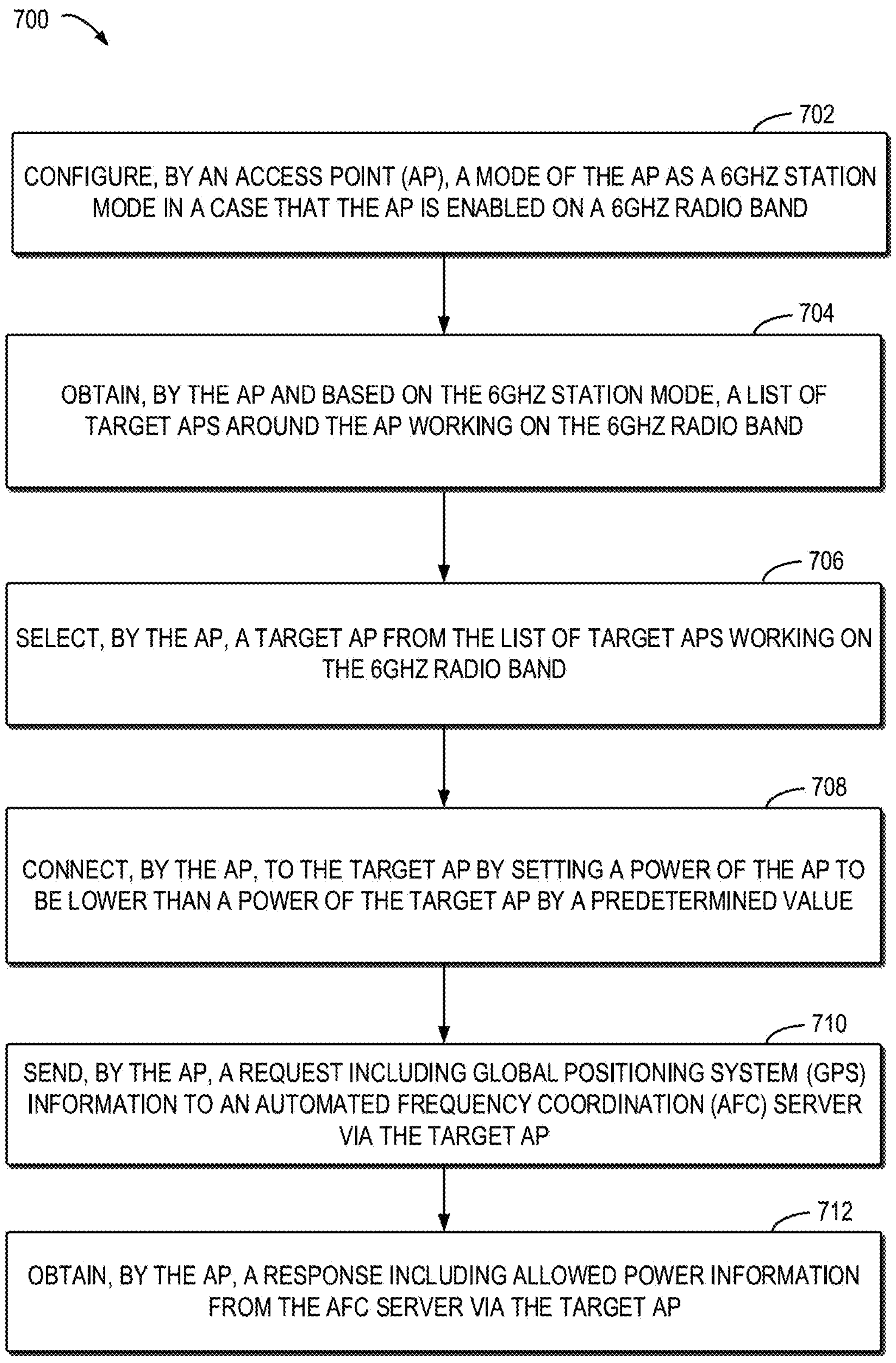
FIG. 7 illustrates a flow chart of an example method for controlling an AP according to implementations of the present disclosure.

FIG. 7 illustrates a flow chart of an example method for saving power according to implementations of the present disclosure, and the method 700 is performed by an AP. At 702, the AP configures a mode of the AP as a 6 GHz station mode in a case that the AP is enabled on a 6 GHz frequency band. For example, the AP has a station mode and an AP mode. When the AP is enabled, the AP is working in the station mode and may establish station mode VAP.

At 704, the AP obtains, based on the 6 GHz station mode, a list of target APs around the AP working on the 6 GHz frequency band. For example, when the AP is configured as a station, the AP may perform passive scanning to obtain the beacon sent by a list of target APs working on the 6 GHz frequency band. Each target AP of the list of target APs is configured to be in the AP mode and may communicate with the AFC service and transfer the AFC request from the station APs to the AFC server. Therefore, the AP may obtain the information of the list of target APs around the AP working on the 6 GHz frequency band.

At 706, the AP selects a target AP from the list of target APs working on the 6 GHz frequency band. In order to communicate with the AFC service, the AP may select a target AP to work on the 6 GHz frequency band. The AP may select the target AP from the list of the target APs based on some predetermined rules. For example, the performance and capacity are enough, and the reliability or stability meets the requirement.

At 708, the AP connects to the target AP by setting a power of the AP to be lower than a power of the target AP by a predetermined value. When the AP is used as a station of the target AP, it will obtain the power of the target AP. In order to connect to the target AP, the AP should reduce the power of the AP and set its power to be 6 dB lower than the power of the target AP.

At 710, the AP sends a request including global positioning system (GPS) information to an automated frequency coordination (AFC) server via the target AP. After the AP connects to the target AP, the AP may collect the GPS information by the GPS module and generate an AFC request including the GPS information. The AP may send the AFC request to the target AP and the target AP transfers the AFC request to the AFC server, which runs the AFC service.

At 712, the AP obtains a response including allowed power information from the AFC server via the target AP.

After the AP sends the AFC request to the AFC server via the target AP, the AFC server will determine the power table for the AP. Then, the AFC server sends an AFC response including the power table for the AP to the AP via the target AP.

In some implementations, after receiving the response from the AFC server, the AP may further determine whether the channel assigned by the AFC server may be used as the working channel between the AP and the target AP. For example, the AP compares the channel list for the AP and the channel list for the target AP to determine whether there is a list of overlapping channels. If there is a list of overlapping channels, the AP may determine whether to establish an AP mode VAP based on the current working channel and the list of overlapping channels. If the current working channel is in the list of overlapping channels, the link between the AP and the target AP on the 6 GHz frequency band will be established. If the current working channel is not in the list of overlapping channels, the AP may communicate with the target AP to adjust the current working channel to a target channel of the list of overlapping channels. If there are no overlapping channels between the AP and the target AP, the AP may remain in the AP station mode or change the link to the other frequency band.

In this way, the AP may use the station mode to connect with the target AP and then use the 6 GHz channel to send an AFC request to the AFC server to obtain the corresponding response. Therefore, the AP may work on the 6 GHz frequency band directly without delay, and remain fully compliant with the current protocols and device. Moreover, the diversity of the channel/power diversity in the AFC response and the 6 GHz traffic loss or the link flapping during the AFC procedure are overcome.

Figure 8:
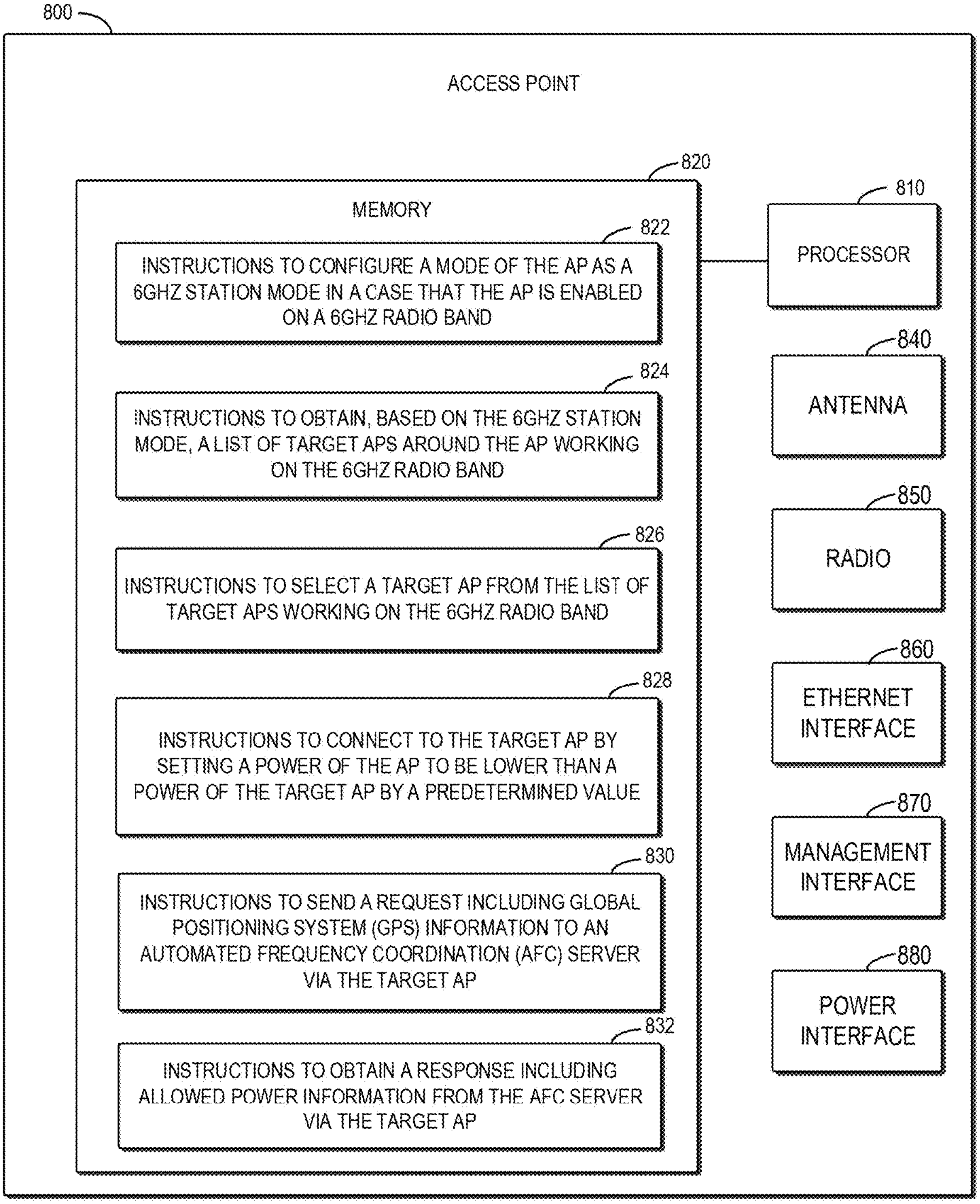
FIG. 8 illustrates an example access point device according to implementations of the present disclosure.

FIG. 8 illustrates an example AP 800 according to implementations of the present disclosure. As shown in FIG. 8, the AP 800 comprises at least one processor 810, a memory 820 coupled to the processor 810, at least one antenna 840, at least one radio 850, an Ethernet interface 860, a management interface 870 and a power interface 880. The memory 820 stores instructions 822, 824, 826, 828, 830, and 832 to cause the processor 810 to perform actions according to reference implementations of the present disclosure.

As shown in FIG. 8, the memory 820 stores instructions 822 to configure a mode of the AP as a 6 GHz station mode in a case that the AP is enabled on a 6 GHz frequency band. The memory 820 further stores instructions 824 to obtain, based on the 6 GHz station mode, a list of target APs around the AP working on the 6 GHz frequency band. Moreover, the memory 820 further stores instructions 826 to select a target AP from the list of target APs working on the 6 GHz frequency band. The memory 820 further stores instructions 828 to connect to the target AP by setting a power of the AP to be lower than a power of the target AP by a predetermined value. As shown in FIG. 8, the memory 820 further stores instructions 830 to send a request including global positioning system (GPS) information to an automated frequency coordination (AFC) server via the target AP. As shown in FIG. 8, the memory 820 further stores instructions 832 to obtain a response including allowed power information from the AFC server via the target AP.

The stored instructions and the functions that the instructions may perform can be understood with reference to implementations as described above. For brevity, the details of instructions 822, 824, 826, 828, 830 and 832 will not be discussed herein.

The at least one antenna 840 in the AP 800 is a crucial component that allows the AP 800 to communicate with wireless devices such as laptops, smartphones, and tablets. The primary function of the at least one antenna 840 may be to transmit and receive wireless signals, converting electrical signals into radio waves for outgoing communication and vice versa for incoming signals.

The at least one radio 850 in the AP 800 is responsible for wireless communication. The at least one radio 850 may handle the conversion of data between wired and wireless forms, making it possible for the AP 800 to transmit and receive data over the air. In a modulation process, the digital data from the wired network may be converted into radio waves for wireless transmission. In a demodulation process, incoming radio waves may be converted back into digital data that the AP 800 can process. The at least one radio 850 may operate on specific frequency bands, such as 2.4 GHz, 5 GHz, or 6 GHz bands. The at least one radio 850 may ensure effective communication by selecting appropriate channels to minimize interference. The performance of the at least one radio 850 may be defined by various Wi-Fi standards, including 802.11a/b/g/n/ac/ax, with newer standards like Wi-Fi 6 and Wi-Fi 7 offering improved speed, efficiency, and capacity.

The Ethernet interface 860 in the AP 800 may be used for connecting the AP 800 to the local network, providing a bridge between the wired and wireless segments of the network. The AP 800 may connect to routers, switches, or directly to the internet through the Ethernet interface 860, enabling the wireless devices to communicate with other network resources and the broader internet. The Ethernet interface may support various speeds, including Fast Ethernet (e.g., 100 Mbps), Gigabit Ethernet (e.g., 1 Gbps), and even Multi-Gigabit Ethernet.

The management interface 870 in the AP 800 may allow network administrators to configure, monitor, and manage the settings and performance of the AP 800. The management interface 870 may be accessed through various methods, such as a web browser, command line interface (CLI), or network management protocols like Simple Network Management Protocol (SNMP). Through the management interface 870, the administrators can set up and modify SSIDs, security protocols, VLANs, and other operational parameters, ensuring the AP 800 operates effectively within the network environment.

The power interface 880 in the AP 800 may supply the necessary electrical power to the device, ensuring that the AP 800 may operate smoothly and effectively. This can be achieved through a direct power supply using an AC adapter connected to a power outlet, or via Power over Ethernet (POE), which delivers power through the same Ethernet cable used for data transmission.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:

configuring, by an access point (AP), a mode of the AP as a 6 GHz station mode in a case that the AP is enabled on a 6 GHz frequency band;

obtaining, by the AP and based on the 6 GHz station mode, a list of target APs around the AP working on the 6 GHz frequency band;

selecting, by the AP, a target AP from the list of target APs working on the 6 GHz frequency band;

connecting, by the AP, to the target AP by setting a power of the AP to be lower than a power of the target AP by a predetermined value;

sending, by the AP, a request including global positioning system (GPS) information to an automated frequency coordination (AFC) server via the target AP; and obtaining, by the AP, a response including allowed power information from the AFC server via the target AP.

2. The method according to claim 1, wherein the obtaining, by the AP and based on the 6 GHz station mode, the list of target APs around the AP working on the 6 GHz frequency band comprises:

capturing beacons by performing passive scanning; and determining, based on the captured beacons, the list of target APs around the AP working on the 6 GHz frequency band.

3. The method according to claim 1, wherein the connecting, by the AP, to the target AP by setting the power of the AP to be lower than a power of the target AP by a predetermined value comprises:

determining a working channel between the AP and the target AP; and configuring the power of the AP on the working channel to be lower than the power of the target AP on the channel by the predetermined value.

4. The method according to claim 1, wherein sending, by the AP, a request including global positioning system (GPS) information to an automated frequency coordination (AFC) server via the target AP comprises:

collecting the GPS information via a GPS module; and sending an AFC request including the GPS information to the AFC server via the target AP.

5. The method according to claim 1, further comprising:

obtaining a first power table of the target AP;

obtaining a second power table for the AP from the response; and determining, based on the first power table and the second power table, a working channel between the AP and the target AP.

6. The method according to claim 5, wherein the determining, based on the first power table and the second power table, the working channel between the AP and the target AP comprises:

determining a set of overlapping channels between a first channel list and a second channel list by comparing the first power table of the target AP with the second power table of the AP, the first power table including a first channel list and the second power table including the second channel list; and determining, based on the set of overlapping channels, the working channel between the AP and the target AP.

7. The method according to claim 6, wherein the determining, based on the set of overlapping channels, the working channel between the AP and the target AP comprises:

determining that a number of the set of overlapping channels is greater than a threshold;

determining, based on determining the number being greater than the threshold, that a working channel between the AP and the target AP is in the set of overlapping channels;

determining, based on power levels for the set of overlapping channels, a target channel from the set of overlapping channels; and adjusting the working channel between the AP and the target AP to the target channel.

8. The method according to claim 7, wherein the determining, based on the set of overlapping channels, the working channel between the AP and the target AP further comprises:

determining that the working channel between the AP and the target AP is not in the set of overlapping channels; and notifying, based on determining that the working channel is not in the set of overlapping channels, the target AP to adjust the working channel between the AP and the target AP to be an overlapping channel of the set of overlapping channels.

9. The method according to claim 7, wherein the determining, based on the set of overlapping channels, the working channel between the AP and the target AP further comprises:

determining that the number of the set of overlapping channels is equal to the threshold;

determining, based on determining the number being equal to the threshold, that the working channel between the AP and the target AP is in the overlapping channels;

allocating predetermined channel resources in the working channel for a communication between the AP and the target AP.

10. The method according to claim 6, wherein the determining, based on the first power table and the second power table, the working channel between the AP and the target AP further comprises:

determining that there is no overlapping channel; and causing, based on determining that there is no overlapping channel, the mode of the AP to remain the 6 GHz station mode.

11. The method according to claim 6, wherein the 6 GHz frequency band is a first frequency band, and the determining, based on the first power table and the second power table, the working channel between the AP and the target AP further comprises:

determining that there is no overlapping channel; and adjusting, based on determining that there is an overlapping channel, a link between the AP and the target AP to a second frequency band, the second frequency band being different from the first frequency band.

12. The method according to claim 11, wherein the response is a first response, the method further comprises:

receiving a second response from the AFC server via the target AP;

determining the working channel between the AP and the target AP is not in a third channel list of the second response;

notifying the target AP of the third channel list to select a target channel from the third channel list; and determining the selected channel as the working channel between the AP and the target AP.

13. The method according to claim 12, wherein the method further comprises:

determining, based on the third channel list, that there are no overlapping channels supported by the AP and the target AP; and adjusting, based on determining that there are no overlapping channels, the link between the AP and the target AP to the second frequency band.

14. The method according to claim 12, further comprising:

determining that the first response is to be expired; and sending, based on the first response being to be expired, traffics between the AP and the target AP on the second frequency band for a first scenario during a link switching, the first scenario being at least one of a multi-band scenario or a multi-link device (MLD) scenario.

15. The method according to claim 14, further comprising:

receiving a beacon frame from the target AP for a second scenario, the second scenario being different from the first scenario and the beacon including a predetermined field; and preventing, based on the predetermined field, traffic between the AP and the target AP in the 6 GHz frequency band during the link switching.

16. An access point (AP) comprising:

at least one processor;

a memory coupled to the at least one processor, the memory storing instructions to cause the at least one processor to:

configure a mode of the AP as a 6 GHz station mode in a case that the AP is enabled on a 6 GHz frequency band;

obtain, based on the 6 GHz station mode, a list of target APs around the AP working on the 6 GHz frequency band;

select a target AP from the list of target APs working on the 6 GHz frequency band;

connect to the target AP by setting a power of the AP to be lower than a power of the target AP by a predetermined value;

send a request including global positioning system (GPS) information to an automated frequency coordination (AFC) server via the target AP; and obtain a response including allowed power information from the AFC server via the target AP.

17. The AP according to claim 16, wherein the instructions to obtain, based on the 6 GHz station mode, the list of target APs around the AP working on the 6 GHz frequency band comprise instructions to cause at least one processor to:

capture beacons by performing passive scanning; and determine, based on the captured beacons, the list of target APs around the AP working on the 6 GHz frequency band.

18. The AP according to claim 16, wherein the instructions to connect to the target AP by setting the power of the AP to be lower than a power of the target AP by a predetermined value comprise instructions to cause at least one processor to:

determine a working channel between the AP and the target AP; and configure the power of the AP on the working channel to be lower than the power of the target AP on the channel by the predetermined value.

19. The AP according to claim 16, wherein the instructions to send a request including global positioning system (GPS) information to an automated frequency coordination (AFC) server via the target AP comprise instructions to cause at least one processor to:

collect the GPS information via a GPS module; and send an AFC request including the GPS information to the AFC server via the target AP.

20. A non-transitory computer-readable medium comprising instructions stored thereon which, when executed by an access point (AP), cause the AP to:

configure a mode of the AP as a 6 GHz station mode in a case that the AP is enabled on a 6 GHz frequency band;

obtain, based on the 6 GHz station mode, a list of target APs around the AP working on the 6 GHz frequency band;

select a target AP from the list of target APs working on the 6 GHz frequency band;

connect to the target AP by setting a power of the AP to be lower than a power of the target AP by a predetermined value;

send a request including global positioning system (GPS) information to an automated frequency coordination (AFC) server via the target AP; and obtain a response including allowed power information from the AFC server via the target AP.

* * * * *